United States Patent [19]

Yang

[11] Patent Number: 4,894,641

[45] Date of Patent: Jan. 16, 1990

[54] REAL-TIME SPEED DISPLAY APPARATUS

[75] Inventor: Bill Yang, Taipei, Taiwan

[73] Assignee: Cotron Corporation, Taipei, Taiwan

[21] Appl. No.: 301,051

[22] Filed: Jan. 24, 1989

[51] Int. Cl.[4] .............................................. B60Q 1/54
[52] U.S. Cl. .................................... 340/466; 340/441;
340/464; 340/479
[58] Field of Search ............... 340/466, 441, 461, 462,
340/464, 479

[56] References Cited

U.S. PATENT DOCUMENTS

| | | | |
|---|---|---|---|
| 3,550,076 | 12/1970 | Kent | 340/466 |
| 3,691,525 | 9/1972 | McClellan, Sr. et al. | 340/466 |
| 3,919,689 | 11/1975 | Despain | 340/466 |
| 4,647,901 | 3/1987 | Teshima et al. | 340/441 |

Primary Examiner—Donnie L. Crosland

Attorney, Agent, or Firm—Spencer & Frank

[57] ABSTRACT

A real-time speed display apparatus for displaying vehicle speed with different colors of light has a speed detector for detecting the speed of revolution of the transmission shaft of a vehicle and outputting a speed signal with its pulse rate varied as a function of the revolution speed. The speed signal is converted into a periodic signal through a timing gate under the control of a clock signal generated by a clock generator. A counter is used to count the number of the pulses within each period of the interval signal, based on which an encoder outputs a corresponding display control signal and transmits it to respective display drivers. Upon receipt of the display control signal, the drivers are started to drive the respective light units. Therefore, different color light is formed on a screen by combination of light emitted by the driven light units.

6 Claims, 3 Drawing Sheets

Fig. 2a R
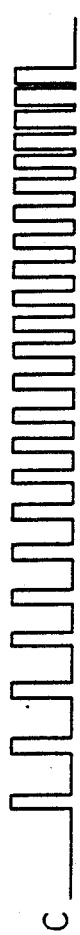
Fig. 2b C
Fig. 2c T

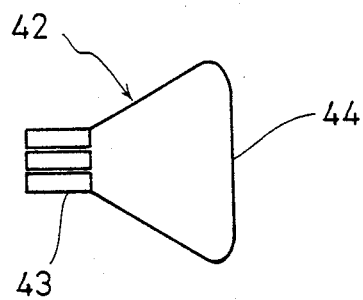
Fig. 3
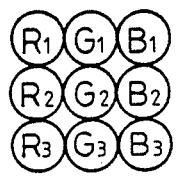
Fig. 4
Fig. 5

REAL-TIME SPEED DISPLAY APPARATUS

BACKGROUND OF THE INVENTION

The present invention relates to a real-time speed display apparatus, and particularly to a real-time vehicle speed display apparatus for displaying vehicle speed lights of different colors.

Generally, the conventional brake systems of vehicles only turn-on the lights at the rear of the car, so as to warn the vehicles behind it that is slowing down as its brake pedal is depressed. However, this way of warning sometimes does not give enough time to vehicles behind to respond to the warning. This is particularly the case, if two cars are rather close to each other, as an accident may easily ocur. On investigation, we can find accidents are mainly the result of sudden braking without forewarning. Therefore, it is believed the danger will almost be prevented if the vehicle in front can give better and clearer messages of deceleration to the vehicles behind.

SUMMARY OF THE INVENTION

The primary object of the present invention is to provide a real-time speed display apparatus for displaying vehicle speed with lights of different colors.

A further object of this invention is to provide a real-time speed display apparatus for avoiding harm and loss as result of braking.

Another object of this invention is to provide a real-time speed display apparatus which not only can warn the vehicles behind, of deceleration but also is decorative.

In accordance with the present invention, a real-time display apparatus for displaying the speed of a vehicle with lights of different colors comprising detection means for detecting the speed of the vehicle and outputting a speed signal; control means coupled to the detection means for generating a display control signal in response to the speed signal; and display means coupled to the control means for generating light of different colors in response to the display control signal. The detection means also comprises a brake detector connected to the brake pedal of the vehicle, and to generate a predetermined control signal to the display means upon detection of the use of the vehicle's brake pedal. Upon receipt of the predetermined control signal, the display means will generate a red light.

BRIEF DESCRIPTION OF THE DRAWINGS

The present invention can be more fully understood by reference to the following description and accompanying drawings, which form an integral part of this application:

FIGS. 2a, 2b, 2c are pulse diagrams for explaining the operation of the circuit of FIG. 1;

FIG. 3 is a schematic diagram of the structure of the display part of FIG. 1;

FIG. 4 is a schematic diagram of light sources of the display plate of FIG. 3; and FIG. 5 is a diagram explaining the relation between the pulse generated by the drivers and the light sources.

DETAILED DESCRIPTION OF THE PREFERRED EMBODIMENTS

Figure 1:
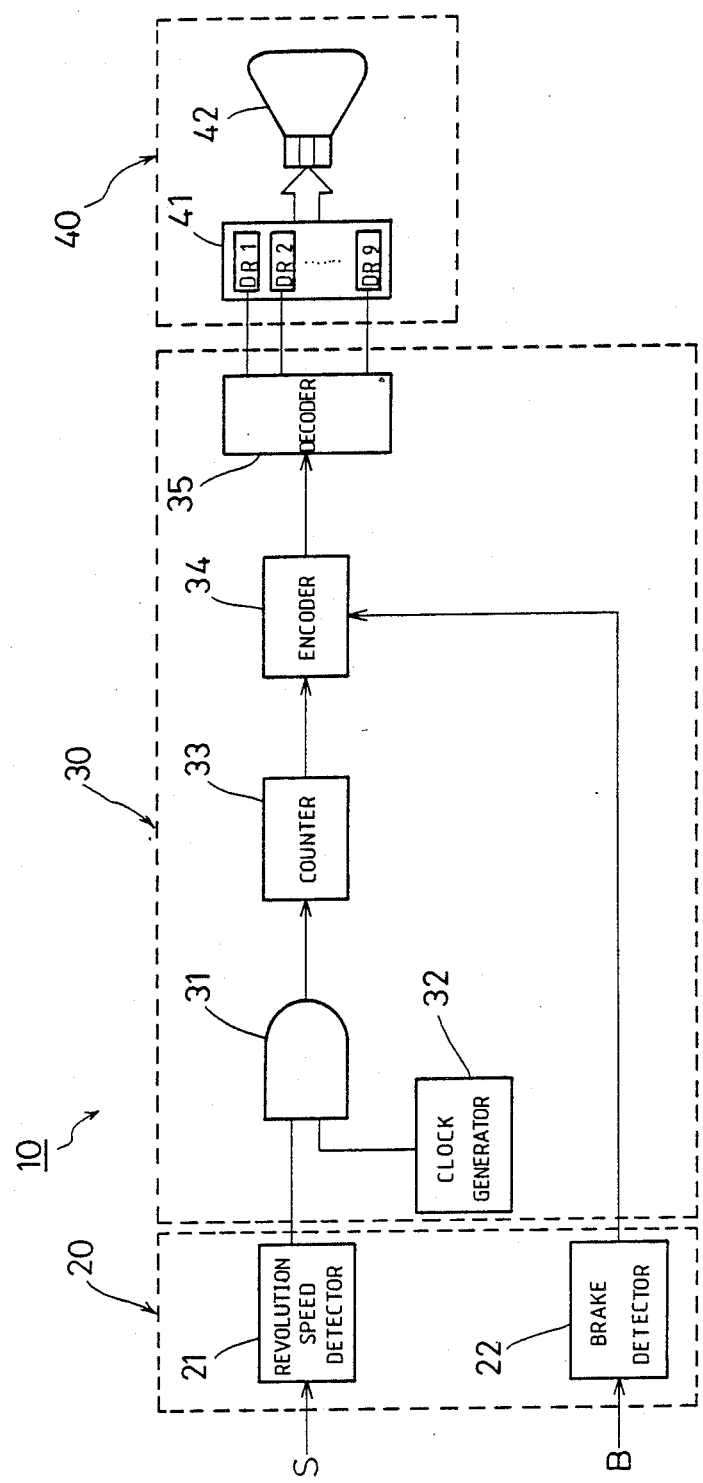
FIG. 1 is a circuit block diagram of a preferred embodiment of the real-time speed display of this invention.

Referring to FIGS. 1 and 2a, 2b, 2c, the real-time speed display apparatus 10 comprises a detection part 20, a control part 30, and a display part 40. The detection part 10 consists of two detectors, a rotational speed detector 21 and a brake detector 22. The speed detector 21 detects the speed of revolution (rotary speed) of the transmission shaft of a vehicle and outputs to a timing gate 31 a speed signal R with the pulse rate varied as a function of the speed of revolution. The timing gate 31 can be a AND gate, in which the speed signal R is converted into a periodic interval pulse signal T with the periodic intervals of time being under the control of a clock signal C generated by a clock generator 32. During any of the periods of time, the signal T will have the same number of pulses as that of the speed signal R. A counter 33 is connected to the output terminal of the timing gate 31 to count the number of pulses for each period of the interval signal T. The content of the counter 33 is subject to the encoding process by an encoder 34 and formed into a sequence code signal. Moreover, a decoder 35 processes the sequence code into a control code so as to start the display part 40.

The display part 40 includes a plurality of drivers 41 and a display plate 42. As shown in FIGS. 3 and 4, the display plate 42 mainly consists of a light source 43 and a screen 44. The light source 43 has three sets of light sources of primary colors, each set includes one or more light source units of primary colors. In this embodiment, the light source 43 is a 3 by 3 primary color light source units, R1, R2 and R3; G1, G2 and G3; and B1, B2 and B3. Therefore, in FIG. 1, the driver 41 also comprises nine drivers DR1 to DR9, in which the drivers DR1 to DR2 are used to drive light source units R1 to R3, the drivers DR4 to DR6 are used to drive light source units G1 to G3, and the drivers DR7 to DR9 are used to drive light source units B1 to B3. As shown in FIG. 5, if the control code generated by the encoder 34 is 111000000, the drivers DR1, DR2 and DR3 are driven to make the light sources R1, R2 and R3 turn-on, so that red light is formed on the screen 22. If the control code is 01110000, the drivers DR2, DR3 and DR4 are driven to make the R2, R3 and G1 turn-on so that orange light is formed on the screen 22. Finally, if the control code is 011011011, the drivers DR2, DR3, DR5, DR6, DR8 and DR9 are driven to make the light source units R2, R3, G2, G3, B2 and B3 turn-on so that white light is formed on the the screen 22. In this embodiment, the color of light formed the on screen 22 is changed from orange, to yellow, to green, to blue, to indigo to purple and to white, that is, from a warm color to a cool color, from the time the car starts to the time it reachs a high speed. As the car slows down, the color of lights changes in the opposite order, that is, from white to orange.

However, it should be noted that the above change of colors is only an example. In fact, different colors can be displayed depending on the number of light source units. This is thus the main reason why aa color display plate is adopted in this invention. Another reason is that people can take a preventive action more quickly in reaction to color light because it needs only a short time of transmission through the visual nerves.

Furthermore, referring to FIG. 1, upon detection of the use of the brake pedal, the brake detector 22, which is coupled to the brake pedal, immediately transmits a brake detection signal to the encoder 34 to interrupt the normal encoding operation on the content of the counter 33 and generates a predetermined control code 111000000 to start the drivers DR1, DR2 and DR3. Therefore, this system can function in the same manner as the conventional brake system, that is, emitting red light when the brake pedal is used. As the brake pedal is released, the display plate 42 will immediately display the color corresponding to the current speed.

In this manner, the real-time display apparatus of this invention can notify the driver of the car behind the change of speed and other information so as to prevent a possible accident assure safety.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A real-time display apparatus for displaying the speed of a vehicle having a transmission shaft, with lights of different colors, comprising:
    detection means for detecting the speed of the vehicle, said detection means including means, responsive to rotation of the transmission shaft of the vehicle, for outputting a speed signal in the form of a pulse signal having a pulse rate which varies as a function of the speed of revolution of the transmission shaft;
    control means coupled to said detection means for generating a display control signal in response to the speed signal, said control means including
    a clock generator for generating a clock signal,
    a timing gate having first and second inputs respectively electrically connected to said detection means and said clock generator, for converting the speed signal into a periodic signal having the same number of pulses as that of the speed signal during predetermined periods of time, the periods of time being controlled by the clock signal,
    a counter, electrically connected to said timing gate, for counting the number of pulses of the periodic signal during each of the predetermined periods of time,
    an encoder, connected to said counter, for encoding the count of said counter at the end of each predetermined period of time to obtain a sequence of code signals, and
    a decoder, connected to said encoder, for decoding the sequence of code signals to obtain the display control signal; and
    display means, coupled to said control means, for generating different colors of light in response to the display control signal.

2. The apparatus as claimed in claim 1, wherein said display means includes:
    a display plate having a screen and three sets of light units of primary colors; and
    a plurality of drivers each connected to one of said light units for driving said light units respectively to generate light of different colors on said screen in response to the display control signal.

3. The apparatus as claimed in claim 2, wherein each of said three sets of light units has at least one light source unit.

4. The apparatus as claimed in claim 1, wherein said timing gate is a AND gate.

5. The apparatus as claimed in claim 1 wherein said detection means comprises a brake detector responsive to use of the brake pedal of the vehicle, and connected to said control means, for activating said control means to generate a predetermined control signal and outputting said predetermined control signal to said display means upon detection of the use of the brake pedal of the vehicle.

6. The apparatus as claimed in claim 5 wherein said display means generates red light upon receipt of the predetermined control signal.

* * * * *